Figure 1:
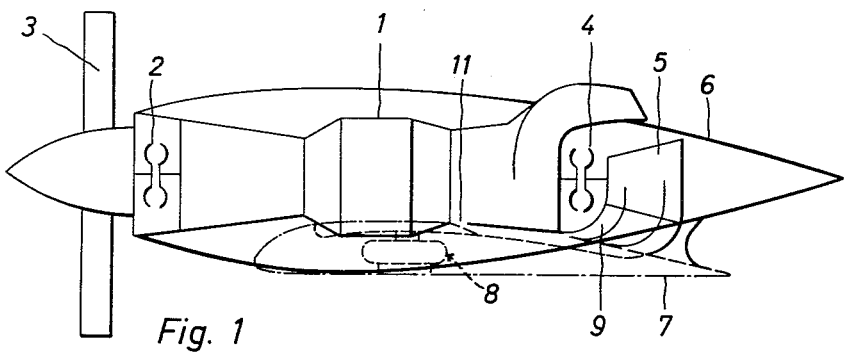

May 22, 1962 H. G. LEIBACH 3,035,790
FLIGHT-PROPULSION POWER PLANT FOR AIRCRAFT WITH A JET
DEVICE FOR ASSISTING IN SHORT OR VERTICAL TAKE-OFF
Filed July 28, 1959 2 Sheets-Sheet 1

INVENTOR
HEINRICH G. LEIBACH
BY
Dicke, Craig and Freudenberg
ATTORNEYS

United States Patent Office 3,035,790
Patented May 22, 1962

3,035,790
FLIGHT-PROPULSION POWER PLANT FOR AIRCRAFT WITH A JET DEVICE FOR ASSISTING IN SHORT OR VERTICAL TAKE-OFF
Heinrich Georg Leibach, Munich, Germany, assignor to BMW Triebwerkbau G.m.b.H., Munich-Allach, Germany
Filed July 28, 1959, Ser. No. 830,095
Claims priority, application Germany Aug. 1, 1958
9 Claims. (Cl. 244—12)

Flight-propulsion power plants equipped with an installation for short or vertical take-off of aircraft are already known in the prior art and have, in the past, been constructed according to various principles. For instance, in some prior art arrangements, the entire propulsion units were pivotably supported in the wings of an airplane or, in other cases, the necessary lift was provided by deflecting the thrust jet, discharged from a gas turbine power plant from the normal direction toward the ground.

Since the power required for a short or vertical take-off of an aircraft is considerably greater than that required for horizontal or level flight, it follows that a propulsion unit, designed for vertical take-off has to be operated with considerable throttling, i.e., at considerably reduced output during horizontal flight and, as a result thereof, with a correspondingly reduced efficiency.

It is known already that the power additionally required for a vertical take-off may be produced by means of disengageable after-burners of any suitable construction which are rendered useful or effective during the start or take-off of the aircraft by deflecting the stream or jet of gas in a downward direction. Such an arrangement, however, in order to burn the fuel completely, necessarily results in a power unit of relatively large overall length and, additionally, the adjustable deflecting installation is continuously exposed to the stream or jet of hot combustion gases.

In order to avoid all the disadvantages encountered with pivotably arranged propulsion units and for gas stream deflector devices presently used for vertical take-offs, and in order to make available at will the additional power required for the vertical take-off without adversely affecting the efficiency of the power plant at level flight, the present invention proposes a flight-propulsion power plant provided with a vertical take-off assist installation which includes one or a plurality of combustion chambers arranged within the profile or contour of the aircraft wings and provided with a discharge nozzle directed downwardly against the ground to which is supplied, on the one hand, pure combustion air either directly or indirectly from the level-flight propulsion power unit and, on the other hand, fuel by means of a device provided in each combustion chamber such as, for instance, a rotary atomizer.

The combustion air may thereby be taken off from the second stage of a two-stage gas turbine power unit or may be supplied to the combustion chambers by an auxiliary compressor which, for this purpose, may be selectively coupled with the shaft of the level-flight propulsion power unit.

Furthermore, according to a preferred embodiment of the present invention, the combustion chambers are constructed as flat chambers corresponding to the thickness of the airplane wings and provided with radially, essentially U-shaped "burn-out" channels and with a centrally arranged gas discharge opening.

The rotary atomizers, arranged centrally within the combustion chambers, are driven or rotated by means of an air turbine operatively connected ahead of the combustion chambers and operated by the combustion air or, in the alternative, the rotary atomizers themselves may form either an axial-flow or a radial-flow turbine provided with appropriate rotor blades.

Preferably, the combustion chambers according to the present invention are constructed as double-walled chambers whereby the combustion air furnished by the propulsion power plant or by the auxiliary compressor is divided at or near the combustion chamber inlet into two streams. The first of these two combustion air streams flows through the combustion chamber to provide the combustion air therefor whereas the second one of these two streams of air flows between the double-walled channel or conduit and serves for the cooling of the combustion chamber wall. The thrust stream or jet which provides the lift for the aircraft is then discharged from the combustion chamber either as a pure gas stream or the discharged gases are mixed in the discharge aperture with the cooling air constituting the second stream.

The auxiliary compressor is preferably arranged in the nacelle of the level-flight propulsion power unit whereby air delivery ducts from the discharge of the auxiliary compressor to the combustion chambers are provided within the wing profile or cross section. The inlet side of the auxiliary compressor, for purposes of sucking off the boundary layer on the wings, may be connected by means of air guide ducts to corresponding slots provided in the wings.

All known power units are suitable as forward or level flight propulsion power unit in the present combination regardless whether they consist of piston-type or turbine-type power units whereas the installation in accordance with the present invention for the vertical take-off is based entirely or exclusively on the principle of jet propulsion. For instance, a piston-type power unit or a turbo-propeller type power unit may be operatively connected to be selectively engageable with an auxiliary compressor.

The drive shaft of the propeller properly speaking is thereby also appropriately connected in a disengageable manner with the propulsion power unit. Such a device enables a vertical take-off by means of the lift jet or stream alone with a simultaneously disengaged propeller whereas, with a simultaneous operation of the forward propulsion, the downwardly, directed jet or stream serves as take-off assist so that a so-called short take-off can be accomplished.

The combination of the starting device according to the present invention with a turbine jet power plant constructed either as a two-stage gas turbine without an auxiliary compressor or as a single stage gas turbine with an auxiliary compressor also enables a short take-off of aircraft. The transition after take-off into horizontal flight preferably takes place, in all cases, by increasing or intensifying the forward thrust produced by the forward propulsion unit while the lift from the take-off assist in accordance with the present invention is correspondingly decreased.

Accordingly, it is an object of the present invention to provide a combined propulsion power plant enabling a short or vertical take-off for an aircraft which is capable of furnishing sufficient power for the forward thrust, the upward thrust, or a combination of both.

Another object of the present invention resides in the provision of a propulsion power plant for short or vertical take-off type aircrafts which operates with a good efficiency during level flight while providing ample power for vertical take-off.

Still another object of the present invention is to provide a propulsion power plant in which the upward thrust of the aircraft or a component thereof is produced by a gas stream or jet discharged from combustion chambers arranged in the wings of the aircraft.

A further object of the present invention is to provide a propulsion power plant enabling a vertical take-off of an aircraft in which the combustion chambers producing the upward thrust are housed within the profile of the aircraft wings and which comprise cooling means to effectively cool and insulate the combustion chambers from the remainder of the wing structure.

Another object of the present invention resides in the provision of a propulsion power plant for short or vertical take-off type aircraft which is both economical and reliable in level flight operation as well as during take-off operation.

Still another object of the present invention is to provide a propulsion power plant for short or vertical take-off type of aircraft in which the fuel is introduced into the upward thrust-producing combustion chambers by means of rotary atomizers.

Still another object of the present invention lies in the provision of a propulsion power plant in which the rotary atomizer in the upward thrust-producing combustion chamber is driven by the combustion air flowing to the chamber.

These and other objects, features and advantages of the present invention will become more obvious from the following description when taken in connection with the accompanying drawings which show, for purposes of illustration only, two embodiments in accordance with the present invention and wherein:

FIGURE 1 shows a somewhat schematic side view of a propeller-turbine power plant for an aircraft provided with an auxiliary compressor according to the present invention.

Figure 2:
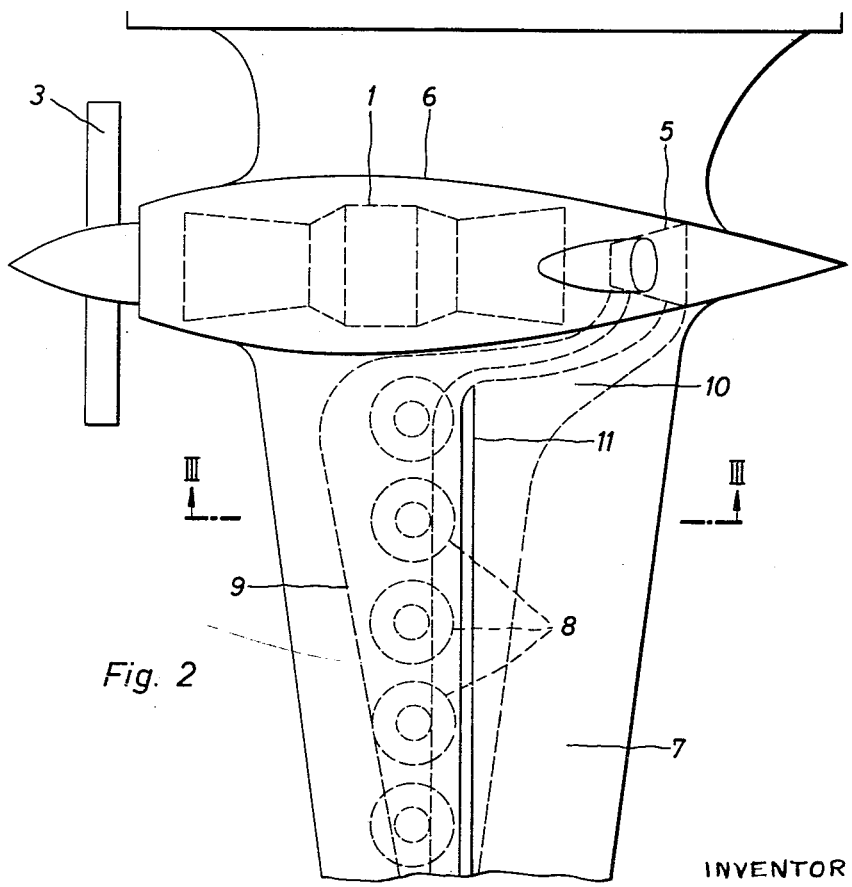
Figure 3:
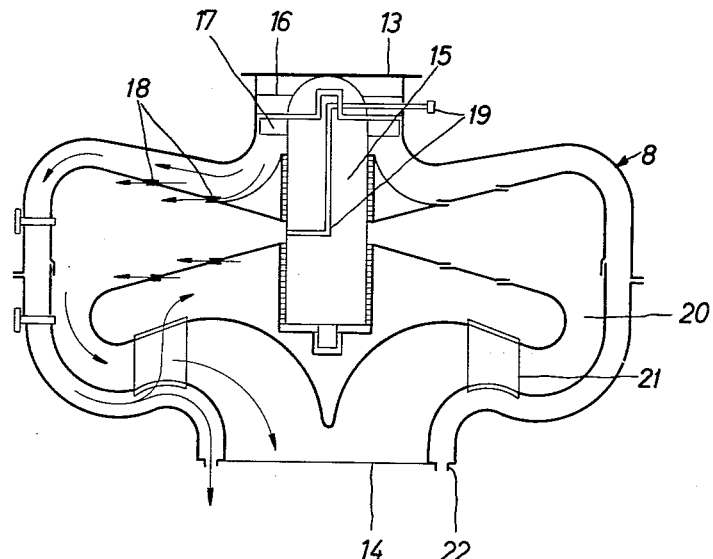
Figure 4:
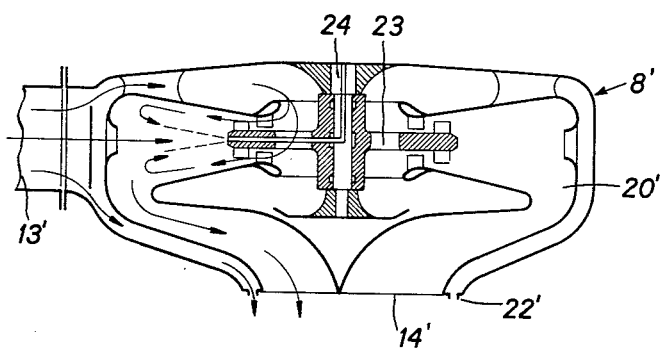

FIGURE 2 is a top view of the power plant of FIGURE 1 showing also the combustion chambers arranged in the wing of the aircraft, FIGURE 3 is a cross-sectional view, on an enlarged scale, through one of the combustion chambers taken along line III—III of FIGURE 2 with the rotary-type atomizer arranged in the combustion chamber constructed as an axial flow type turbine, and FIGURE 4 is a cross-sectional view, similar to FIGURE 3, through a modified embodiment of a combustion chamber similar to that illustrated in FIGURE 3 but in which the rotary centrifugal-type atomizer is constructed as a radial flow type turbine.

Referring now to the drawings, wherein like reference numerals are used throughout the views thereof to designate like parts, reference numeral 1 designates the turbine of the propeller turbine-power plant illustrated in FIGURES 1 and 2, which is operatively connected by means of a selectively disengageable means 2 of any suitable construction with the propeller 3 and by means of another disengageable means 4 of any suitable construction with an auxiliary compressor 5. The complete power unit is accommodated in the usual manner within a nacelle 6 located in the aircraft wing 7. The disengageable means 2 and 4 may be suitably constructed clutches or preferably hydrodynamic couplings adapted to be emptied of the hydraulic fluid for the effective disengagement thereof.

In the embodiment illustrated in the drawing, a plurality of combustion chambers 8 are disposed within the wing profile which are in communication through an air channel 9 with the auxiliary compressor 5, or, in the case of a two-stage gas turbine, with the discharge side of the second stage thereof.

FIGURES 1 and 2 further show that the intake side of the auxiliary compressor 5 is connected by means of a channel or conduit 10, with slots 11 disposed on the topside of the aircraft wings. The slots are intended to produce the aforementioned boundary-layer suction effect.

FIGURE 3 shows a cross-section through one of the combustion chambers 8 in which the rotary atomizer 15 is constructed as an axial flow turbine. In this embodiment, the inlet side 13 and the discharge side 14 of the combustion chamber are arranged on mutually opposite sides with respect to the rotary atomizer 15 rotatively supported therebetween. Guide vanes 16 are provided in the inlet channel 13, whereas the rotary atomizer 15, is provided with runner or turbine blades 17 on the input or inlet side thereof.

The combustion chamber, corresponding to the position thereof within the wing profile, is constructed as a flat, ring-shaped chamber into which part of the air is delivered as primary combustion air and as secondary combustion air through slots 18, whereas the remainder of the air flows around the outer wall of the combustion chamber so as to cool the same. The fuel is supplied to the combustion chamber mouth or orifice through the bore 19 in the rotating member 15 and is mixed with the combustion air within the combustion chamber by centrifugal action as is known, per se. In order to obtain sufficient burn-out path, i.e., a sufficient distance for complete combustion of the fuel, the exit or discharge portion 20 of the combustion chamber is U-shaped so as to extend radially inwardly. Hollow guide vanes 21 are arranged in the exit or discharge portion 20 to direct the combustion air and combustion gases to the underside of the combustion chamber. The discharge aperture 14, which is directed downwardly toward the ground, is surrounded by an annularly-shaped space through which cooling air flows, which cooling air is discharged through openings 22 so as to mix with the combustion gases discharged through the opening 14.

The embodiment of the combustion chamber 8' according to FIGURE 4 differs from the combustion chamber disclosed in FIGURE 3 essentially in the construction of a rotary atomizer 23 having a bore 24 therein as a radial flow turbine. The air inlet 13' leading into the combustion chamber 8', contrary to the previously described inlet of FIGURE 3, is disposed laterally thereof and, consequently, hollow guide vanes in the combustion chamber outlet adjacent discharge 14' may be dispensed within this embodiment. Combustion chamber 8' has an essentially U-shaped discharge portion 20' and cooling air discharge openings 22' similar to discharge portion 20 and openings 22 of FIGURE 3.

While I have shown and described two embodiments in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A flight propulsion power plant provided with a main propulsion unit adapted to produce a forward thrust for propelling an aircraft having wing means during normal forward flight and provided with auxiliary means to enable an essentially vertical or relatively short take-off of said aircraft, said auxiliary means comprising downwardly directed jet-producing means within said wing means, said downwardly directed jet-producing means including a combustion chamber, said combustion chamber being constructed as a relatively flat chamber including radially-directed, U-shaped burn-out channels and provided with a gas discharge nozzle located essentially centrally of said combustion chamber, means for supplying combustion air to said combustion chamber from said forward propulsion unit, and means including fuel injection means in said combustion chamber for supplying fuel to said combustion chamber for combustion therein with at least a part of said combustion air to thereby produce the downwardly directed jet and therewith the lifting thrust.

2. A flight propulsion power plant according to claim 1, wherein said jet producing means including a plurality of combustion chambers with the discharge nozzles thereof directed downwardly.

3. A flight-propulsion power plant according to claim 1, wherein said fuel injection means includes rotary atomizer means provided with rotor blades forming the blading of an axial-flow-type turbine.

4. A flight-propulsion power plant according to claim 1, wherein said fuel injection means includes rotary atomizer means provided with rotor blades forming the blading of a radial-flow-type turbine.

5. A flight propulsion power plant provided with a main propulsion unit adapted to produce a forward thrust for propelling an aircraft having wing means during normal forward flight and provided with auxiliary means to enable an essentially vertical or relatively short take-off of said aircraft, said auxiliary means comprising downwardly directed jet-producing means within said wing means, said downwardly directed jet-producing means including relatively flat combustion chambers having essentially U-shaped burn out channels leading to gas discharge nozzles, said combustion chambers being provided with double walls, means for supplying combustion air to said combustion chamber from said forward propulsion unit, and means including the inner of said double walls for dividing said combustion air into two air streams one of said air streams flowing into said burn out channels and the other one of said air streams passing through the space formed between the double walls of said combustion chamber to cool the same, and means including fuel injection means for supplying fuel to said combustion chamber for combustion therein with at least a part of said combustion air.

6. A flight-propulsion power plant according to claim 5, wherein the combustion products discharged through said nozzles are mixed with the air stream passing through the space formed between said double walls.

7. A flight-propulsion power plant according to claim 1, wherein said combustion chamber is provided with a double-walled duct along the outer periphery thereof, and wherein a portion of said combustion air is diverted into said duct to cool the walls thereof.

8. A flight-propulsion power plant according to claim 7, wherein fuel injection means includes a rotary atomizer in said combustion chamber.

9. A flight propulsion power plant provided with at least one forward propulsion unit adapted to produce a forward thrust for propelling an aircraft having wing means during normal forward flight and provided with auxiliary means to enable an essentially vertical or relatively short take-off of said aircraft, said auxiliary means comprising downwardly directed jet-producing means within said wing means to produce a thrust lifting said aircraft, said downwardly directed jetproducing means including at least one essentially flat annular combustion chamber terminating in an essentially centrally located discharge nozzle, means for supplying combustion air essentially radially to said combustion chamber from said forward propulsion unit, fuel injection means including rotary atomizer means in said combustion chamber for supplying fuel to said combustion chamber for combustion therein with at least a part of said combustion air and for subsequent discharge through said nozzle to thereby produce the downwardly directed jet and therewith the lifting thrust.

References Cited in the file of this patent

UNITED STATES PATENTS

| | | |
|---|---|---|
| 2,308,477 | James | Jan. 12, 1943 |
| 2,589,732 | Riviere | Mar. 18, 1952 |
| 2,602,292 | Buckland et al. | July 8, 1952 |
| 2,604,277 | Anxionnaz et al. | July 22, 1952 |
| 2,899,149 | Breguet | Aug. 11, 1959 |
| 2,930,544 | Howell | Mar. 29, 1960 |

FOREIGN PATENTS

| | | |
|---|---|---|
| 903,462 | France | Jan. 15, 1945 |